United States Patent Office 3,503,762
Patented Mar. 31, 1970

3,503,762
INK COMPRISING LIGNIN-BASED COLORANTS
Robert K. Remer, Evanston, Ill., assignor to Inca Inks, Inc., Evanston, Ill., a corporation of Illinois
No Drawing. Continuation-in-part of application Ser. No. 251,006, Jan. 14, 1963. This application Mar. 14, 1966, Ser. No. 536,564
Int. Cl. C09d 11/00, 11/02; C07g 1/00
U.S. Cl. 106—23                          4 Claims

ABSTRACT OF THE DISCLOSURE

An alkali-dispersible ink which includes, as a color constituent thereof, the reaction product formed by chemically reacting a lignin with an insolubilizing metal salt and a tannin, filtering and drying said reaction product and combining the same with an emulsifying base.

---

This application is a continuation-in-part of my copending application, Ser. No. 251,006, filed Jan. 14, 1963, and entitled "Inks, Pigments and Adhesive Coatings."

The present invention generally relates to new and useful lignin base colorants, color-forming intermediates, chromogens, dyes, pigments, inks, and the like, and to methods of producing these products. More particularly, this invention is directed to a new and improved colorant or chromogen having as a principal ingredient thereof the reaction product of lignin with certain metallic salts and/or tannins. In a preferred embodiment of the present invention, oleophilic amines, protein polymers, cellulosic polymers and other resinous materials are combined with a lignin-tannin-metallic salt reaction product to provide colorants exhibiting improved tonal characteristics and other advantageous features which are more fully explained below.

The utility of the lignin based colorants of the present invention is extensive and varied. Typically, the products of this invention can be used in the manufacture of toners for use in electrostatic photocopy machines, carbon paper, paints, dyes, pigments and inks. As such, they can be used to color, paint, dye or print cellulosic products, leather, fabrics and the like. In this regard, it is important to note that the lignin base colorants of the present invention produce black inks which are particularly suitable for use as printing inks.

While lignins, as such, have been incorporated in prior art dye, pigment and ink formulations, these prior art uses of lignin are readily distinguishable from the applicant's novel lignin formulations. In particular, the present invention is concerned with the use of a lignin reaction product as the coloring matter or color constituent in inks, pigments, dyes and the like. Prior art teachings on the other hand have generally concerned themselves with the use of lignin and lignoresinous materials as dispersants, vehicles, water loss reducing agents, etc.

An important feature of inks made in accordance with the present invention concerns their unique and highly advantageous property of bonding firmly and intimately to paper upon which they are applied without the undesirable usual penetration of these materials into the paper itself. In other words, they are "non-blocking." An important aspect of the "non-blocking" property of these inks is that the thickness of paper required for achieving sufficient opacity to enable both sides of the paper to be printed is reduced, leading to increased economy in the amount of paper pulp required for a given printing operation.

Another important advantage of the lignin base products of the present invention is the ease and facility of their ultimate removal from printed matter and the removal of the color from the inks themselves during reclamation processes enabling recovery of high grade cellulosic products. Other important features of this invention, as will be explained hereinafter, are that the products thereof are alkali dispersible and the inks readily "bleachable."

It is a noteworthy feature of the lignin base printing inks of the invention and one of considerable economic significance, that the lignin raw materials which can be used in preparing the products of the invention are available in large quantities at low cost. Waste sulfite lignins, alkali lignin liquors, and products derived from spent sulfite liquor yeast culture preparations may be used.

In accordance with the practice of the present invention, waste alkali and waste sulfite lignin liquors and lignin liquors derived as effluents from other industrial processes are used as raw materials from which valuable condensable thermoplastic polymers, cross-linked polymers, and insolubilized polymers and stable color-resin forming intermediates are recovered. The intermediates isolated or recovered from the lignin liquors are capable of reacting still further to form thermoplastic and thermosetting polymers. They may be reacted with protein type polymers and with cellulosic and other resin polymers and may be cross-linked with these polymers. The organic reactive and polymerizable materials obtained from the lignin liquors are condensable with aldehyde and other reactive groups to provide the alkali-dispersible products of the present invention.

It is a principal object of the invention to provide improved lignin resins derived from effluent or from waste sulfite and waste alkali lignin liquors, which resins are highly reactive and which are cross-linked with a wide variety of metallic salts, tannins, cellulosic, protein, and other polymeric or polymerizable material to produce alkali-dispersible products thus effectuating the ultimate reclaiming of high quality cellulosic fibers for reuse in paper fabricating processes.

It is another important object of the invention to provide a new and economical process for the utilization of alkali and spent sulfite lignin liquors whereby valuable condensable lignin chemicals and natural polymers are cross-linked and polymerized with amines, phenols, aldehydes, metallic salts, tannins and other compounds to provide polymers and copolymers which may in turn be reacted with a wide variety of resins, elastomers, and polymers to produce alkali-dispersible end products.

It is still another important object of the invention to provide a catalyst to facilitate the neutralization of the sulfite lignin liquors and to activate the lignin components to promote the copolymerization of the naturally occurring lignin polymeric and polymerizable materials with resins, elastomers, and polymers, etc.

It is another principal object of the invention to provide an improved printing ink which will bond firmly to but which will not penetrate appreciably into the cellulosic surface to which it is applied and which is suitable for use with lightweight stock.

A related important object of the present invention is to provide improved pigments for printing inks in which the color or coloring pigment is a "bleachable" reaction product of lignin with color producing reactants.

Another object of the present invention is to provide a technique for effecting improved color transfer from a colorant or dye to a substrate surface.

Another object of the present invention is to provide a technique for manufacture of improved pigments which technique involves the use of oleophilic cationic amines for increasing color transfer from a dye or other colorant to the substrate surfaces of the particles which form said pigment.

Another object of the present invention is to provide an improved technique for increasing the receptiveness of a substrate surface to the unique lignin base dyes and colorants thereof.

Another object of the present invention is to provide a pigment exhibiting improved emulsification characteristics, which pigment is prepared from the lignin reaction product of the present invention, a cationic oleophilic amine and suitable substrate particles.

It is an object of the present invention to provide a relatively simple and economical process for producing photosensitive, electro-conductive and magnetic responsive alkali-dispersible dyes, inks, pigments and related products from suitable lignin sources such as, for example, alkali and spent sulfite liquors.

Still another important object of the present invention is to provide improved printed products in which the applied ink exhibits a minimum of "show-through," and to effectuate thereby the practical use of lighter weight paper stock.

A related object is to provide an improved printed sheet in which the separation of the ink from the cellulose portion during ultimate reclaiming procedures is greatly facilitated, and in which the color-responsible elements of the ink are readily neutralized to provide essentially colorless recovered cellulosic products.

Other important objects of the present invention are: to provide an ink pigment which may be readily bleached to simplify de-inking processes and paper recovery and reclaiming; to provide new and improved alkali-dispersible color mordants for printing inks; to provide a method of forming a color coupling mordant with a natural lignin polymer and in which the lignin molecule has the ability to hydrogen bond with either hydrated mineral, cellulosic or protein polymer surfaces to form colored resins and pigments.

The importance of this invention and the advantages afforded thereby will be more fully appreciated from the detailed description and claims which follow. While there is no intention to be limited in any manner by any theory expressed herein, theories and mechanisms have been and will be proposed from time to time in the description of the invention and in the explanation of the reactions and phenomena involved.

In preferred embodiments of the invention the polymers and resins contained in the alkali and sulfite base lignin waste liquors are condensed with aldehydes. One step of the method of carrying out the invention is to neutralize the lignin sulfonic acid groups of the sulfite lignin with ammonia or with urea. The ammonia or the urea-neutralized lignin sulfonic acid compounds react during cross-linking with formaldehyde to provide superior water-resistant products (i.e. inks) which are alkali-dispersible in fiber reclaiming processes. Both ammonia and urea contribute to the ease of polymerization of the lignin natural monomers and polymers. In addition the ammonia and the urea promote the formation of strong hydrogen bonds when the products of the invention are printed or are coated on hydrogen-bonded paper.

While not essential to the practice of the present invention, the lignin solution can be neutralized with a suitable base such as sodium hydroxide, potassium hydroxide, potassium hydroxide, other strong alkali metal hydroxides, alkaline earth metal hydroxide, or organic bases. A special metallic oxide catalyst can be used in combination with the alkali. The catalyst, which is preferably zinc oxide, is an important element in minimizing the degradation of the lignin polymers during condensation reactions and is believed to have the desirable effect of modifying the lignin sulfonic acid groups so that amino-group-containing substances with which the lignin is reacted are rendered capable of further condensation with aldehydes. This effect may be due to activation of one or of both hydrogens of the amino groups involved.

In preferred embodiments of the invention the lignin base polymers and polymeric compositions are reacted with tannins such as logwood extract, and related substances, and with selected metal salts to provide mordants having intense dark colors suitable for printing ink purposes. Printing inks prepared in accordance with the teachings of the invention are readily removable from paper stock during reclaiming operations and the dark colors of the inks of the invention readily "bleached" to facilitate effective reuse of the stock.

Spent or waste sulfite lignins, alkali lignin liquors, and lignin products derived from other sources such as spent sulfite liquor yeast culture preparations find utility in the practice of the present invention. Spent sulfite lignin liquor is an effluent from the pressure digestion of woods and similar vegetable materials in commercial paper-making processes. In such paper-making digestion processes, about 50% of the solids of the raw wood input is recovered in the form of cellulose pulp. The remaining 50% solids of the starting material feed is found in the waste sulfite liquor effluent from the pulp digesters. The paper-making by-product spent sulfite liquors contain lignin and varying amounts of a complex mixture of wood sugars, such as xylose, glucose, fructose, etc., some of which are sulfonated, some of which are reduced and which are in various stages of hydrolysis. In addition to these and other organic components, the lignin sulfite liquor contains appreciable quantities of inorganic bisulfites and free sulfurous acid. The pH of the solution is ordinarily in the range of from about 3 to 4. The bisulfites may be alkali metal salts, or alkaline earth metal salts, particularly salts of calcium.

Sulfite spent liquors from which the sugars have been partially or completely removed by any of the usual methods, and which thus contain primarily lignin sulfonates, and also suitable for use as starting products in the preparation of the composition of this invention.

In addition to the acid lignin sulfite liquors and the lignin sulfite yeast culture effluents (e.g. Toranil, a sulfite lignin purified of wood sugars, Lake States Yeast and Chemical Division of St. Regis Paper Co.) which find utility as raw material sources for the products of the present invention, the alkali lignins form the black liquor of the alkaline processes are also useful. These lignins are by-products of the pressure digestion of wood and related cellulose materials. The waste effluents from the digesters ordinarily contain about 50% of the original solids of the raw material used. This alkali lignin also contains complex mixtures of sugars, such as xylose, glucose, and fructose. Some of these are sulfonated, some are reduced, and the products are in various stages of hydrolysis. Before purification, the alkali lignin contains large quantities of alkali metal salts and free alkali, the pH of the solution being ordinarily in the range of about 8 to about 11.

Sulfonated alkali lignins suitable as reactants in the preparation of the products of the present invention may be produced by precipitating alkali lignin (contained in alkaline spent pulping liquor) by means of a mineral acid, isolating the precipitated lignin material and treating it with either sulfurous acid or a water-soluble bisulfite until a water-soluble sulfonated lignin material is formed—all as is well known in the relevant art. The sulfonic acid groups of lignin react with proteins and with related chemicals to form insoluble complexes useful in the practice of this invention. It is a most important feature of the present invention that the lignin inks are readily dispersible in alkali, thus facilitating the ultimate reclaiming of the paper stock for further use.

Sulfite lignin products useful in the practice of the present invention include lignosulfonic acids which are separated from sulfite pulping liquor by electrodialysis. In this procedure, the catholyte consists of cooking said salts which, depending upon the alkali used, may be sodium, magnesium, ammonium, or calcium salts, or acid salts. The anolyte consists of hexose and pentose sugars, acetic acid and other low molecular weight materials, depending on the pore size of the membrane used in the electrodialysis. The free lignosulfonic acids recovered from the electrolysis are extremely tacky substances. They can be polymerized to products of molecular weight of 150,000 or higher. The polymers are highly reactive and find use as reactants to produce the improved products of the invention.

The alkali lignins, particularly those derived from Southern woods, include naturally occurring polymer compounds. These are believed to include a series of closely linked benzene, pyran and furan rings carrying such substituents as methoxyl, hydroxyl, and phenolic groups and other groups which can participate in cross-linking reactions with other polymeric and polymerizable materials.

The composition of the spent sulfite and alkali lignin liquors is, as may be expected, somewhat variable depending upon the cooking conditions and the fibrous material used. However, the content of lignin sulfonate ordinarily ranges between about 40 and about 70 percent by weight (dry basis). A product of this type is a sodium base or ammonium base sulfite spent liquor manufactured and sold by Crown Zelerbach Corporation, San Francisco, Calif., under the trademark Orzan in liquid form in a wide range of concentrations, as well in the form of a dry powder.

In accordance with the present invention, it has been discovered that the neutralization of sulfite lignin liquors with alkali containing a catalyst such as zinc oxide and then further alkalizing the lignin liquor with ammonia, triethanolamine, or with urea has the effect of producing reactive nitrogen-containing groups in proteins, terpene hydrocarbon alkali soluble resins and other resins and polymers of the type solubilized by ammonia, and renders these materials capable of condensing readily with aldehydes or phenols to form useful thermoplastic inks, pigments, and dyes.

A markedly improved reaction system is achieved by incorporating with the alkali used to neutralize the lignin solution and the sulfonic acid groups and the carboxylic acid groups of the lignin acids a catalytic material preferably of the zinc oxide type. It has been found that in this particular type of system, and under these conditions, amino groups of protein-type compounds are rendered more reactive and subsequent amino-aldehyde polymerization reactions are facilitated. The activation of the amino group is believed to be due to the activation of one or more of the hydrogens of the group. Amines of the type which find utility in the practice of the present invention include aliphatic, aromatic, and heterocyclic primary and secondary amines. Other reactive nitrogen compounds include amides, amines, amino-triazines, and the thio counterparts of any such groups of substances. Typical among representative compounds are urea, dimethylol urea, dimethylol ethylene urea, biuret, guanidine, dicyandiamide, dicyandiamidine, melamine, and others. Aromatic and substituted aromatic amines such as aniline, phenylenediamines, naphthylamines benzidene, 4-amino diphenyl amine, and homologues of aniline such as toluidines and xylidines, also find utility in the practice of the invention.

In accordance with one embodiment of the present invention, it has been discovered that cationic oleophilic amines can be used to substantially improve the transfer of color from a colorant or dye to a substrate surface. In particular, it has been found that when a substrate surface is pretreated with cationic oleophilic amines or, when these amines are incorporated in the lignin base dye or colorant formulations of the present invention that color transfer to a substrate surface is substantially improved. While applicant does not wish to be bound to a particular theory of explanation for this phenomenon, it is believed that these cationic oleophilic amines improve the release of color from the dye or colorant and also increase the color receptiveness of the substrate surface. As such, the use of cationic oleophilic amines with the lignin base colorants or dyes of the present invention provides a substantially improved pigment. In this connection, it is also significant to note that such pigments exhibit excellent emulsifying properties which enable them to be used in the manufacture of lignin base inks embodying the many advantages of this invention.

An important aspect of the use of oleophilic amines in accordance with the present invention concerns the fixing of these amines to substrate surfaces. In this connection, it has been found that inorganic or organic acids can be used to neutralize these amines and thereby fix them to the surfaces of the substrate particles. The neutralization step can be carried out by incorporating the oleophilic amine and acid in the lignin base colorant formulation or, if desired, by treating the substrate materials to be dyed with the cationic oleophilic amine and then neutralizing this oleophilic coating with an acid prior to admixing of said particles with the lignin base colorants. In certain instances, the oleophilic amines may be combined with an amine salt and applied as an oleophilic amine coating which is then fixed by the addition of a suitable base. Illustrations of this technique are described in Examples 12 and 13 wherein a cationic oleophilic amine is prepared by mixing 30 parts by weight of dialkyl dimethyl ammonium chloride with 1 part by weight of an ethoxylated acetate. The ethoxylated acetate can be prepared by neutralizing 100 parts of an ethoxylated amine with 16.4 parts of glacial acetic acid. In this connection, it should also be noted that in those instances wherein the cationic oleophilic amine is incorporated into the lignin base dye formulation, that the amine can be first combined with the lignin, metallic salt or tannin constituents.

This use of cationic amines is distinguishable from prior art teachings regarding these materials in that these prior art teachings generally concern themselves with coating of the pigment particles, as opposed to coating of substrates which will ultimately form pigment particle. In general, it is believed that these prior art teachings are directed to reducing the agglomeration of pigment particles while the concept of the present invention is one of improving color transfer to a substrate surface.

Examples of suitable cationic oleophilic amines which can be advantageously used to provide improved color transfer from a dye or colorant to a substrate surface include: long chain aliphatic amines; alkylene polyamines (i.e. ethylene diamine, propylene diamine, tetraethylene diamine, coco-diamines, etc.); tertiary butylamine; 2-ethylhexylamine; isopropylamine; monoamides of hydrogenated tallow fatty acids; tetraethylene pentamine; amine oxides; salts of aliphatic, cyclic, aromatic and heterocyclic primary, secondary and tertiary amines and polyamines; quaternary ammonium compounds; imidazolone and derivatives thereof; and other compounds exhibiting similar oleophilic properties.

Commercially available oleophilic cationic amines which are suitable include: Ethomeen S/12 (an ethoxylated amine, Armour Industrial Chemical Co., Chicago, Ill.); Monazoline O (a 1,2 substituted Imidazoline, Mona Industries, Inc., Patterson, New Jersey); Arquad 2S (dialkyl dimethyl quaternary ammonium chloride, Armour Industrial Chemical Co.); Armeen SZ (sodium N-coco beta amine butyrate, Armour Industrial Chemical Co.); Duomeen T Dioleate (an aliphatic amine salt, Armour Industrial Chemical Co.); Sipenol (short chain amines and fatty amine ethoxylates, Alcolac Chem. Corp., Baltimore, Md.); Sapamines (stearyl and oleyl amines, Ciba Co.); Ammonyx (tallow dimethyl benzyl ammonium chloride, di-tallow dimethyl ammonium sulfate, Onyx Chemical Corp.); Primene (t-butylamine, Rohm & Haas); Rosin Amine D (a stearate of an amine derived from rosin, Hercules Powder Co.); Alamac H 26 (a distilled tallow amine acetate, General Mills); and Aliquats (difatty dimethyl ammonium chloride compounds, General Mills).

As noted, the cationic oleophilic amines of the present invention can be used to coat substrate materials in a separate pretreatment step or, if desired, can be combined with the reactants which form the lignin-tannic-metal salt reaction product of the present invention. An example of a suitable pretreatment oleophilic substrate coating operation is as follows:

| | Grams |
|---|---|
| Monazoline O | 1 to 2½ |
| Mineral spirits | 85½ |
| Attagel 40 | 15 |
| Phosphoric acid | 1 to 1½ |

The Monazoline O is first solubilized by thoroughly mixing it with the Mineral spirits (a solvent) at room temperature. The Attagel 40 (a micron sized clay substrate material) is then shear mixed with the Monazoline O solution for about 15 minutes at which time the surfaces of the Attagel 40 particles are uniformly coated with the Monazoline O solution. The phosphoric acid is then added to neutralize the Monazoline O and fix this imadazoline to the surfaces of the substrate particles. The thus treated substrate is now characterized by an oleophilic coating which is highly receptive to the lignin base dyes and colorants of the present invention.

A neutralization procedure for lignin solutions using alkali and zinc oxide is shown below:

Use of ZnO in neutralization reaction (1) 33.2 gallons 55% Norlig (Lignin products of the Marathon Paper Company)
(2) Add 4.2 gal. water to bring solids to 50%
(3) Add 2200 cc. of neutralizing solutions [1]
(4) pH after reaction—7.3
(5) React 2 hrs. at about 180° F. and add 150 cc. of preservative (Dowicide)

Final product: solids content 49.6%, pH=7.1.

| [1] Neutralizing solution: | G. |
|---|---|
| Water | 2,000 |
| ZnO | 560 |
| NaOH | 1,430 |

The zinc oxide is believed to aid in preventing the precipitation of sulfur when the lignin sulfite liquors are neutralized. Thus, in a preferred embodiment of the invention the acid spent sulfite lignin liquors are neutralized to a pH of about 7 with sodium hydroxide containing a zinc oxide catalyst. Further alkalization of the sulfite lignin liquors is then carried out with ammonia or urea and the pH of the final liquor is adjusted to neutral or to a slightly alkaline pH, for example, a pH in the range of about 7 to about 9. The lignin solution, so prepared, contains a substantial fraction of compounds containing active nitrogen groupings and will react with phenols and aldehydes, etc. to produce condensation products.

Many different aldehydes and aldehyde-group-containing compounds may be used as reactants in condensation reactions with the materials obtained from lignins. Monomethylol methyl hydantoin is a preferred aldehyde for condensation with the lignin resin polymers. In addition, many other compounds containing an aldehyde group may be used. Typical examples include furfural, glyoxal, formaldehyde, acetaldehyde, butyraldehyde, acrolein, crotonaldehyde, benzaldehyde, dialdehyde starch, paraformaldehyde and formalin, etc.

Additional organic compounds and materials with which the lignin-amine reaction products of the present invention may be polymerized or combined are alkali-soluble cellulose ethers, carboxymethyl cellulose, polyvinyl alcohol, hydroxyethyl cellulose, polyethylene oxide polymers, carboxylated polyvinyl acetate, polyvinyl acetate, zein, polyvinyl pyrrolidone, extracted animal protein (hide glue) extracted fish proteins (fish glue, e.g. Collagen) starch, deacetylated derivatives of N-acetyl D-glucosamine, dextrines, casein, soya protein, wheat gluten protein, blood albumin, egg albumin, extracted animal blood, peanut protein, seaweel alginates, lecithin, amylopectin starch, monomethylol dimethyl hydantoin, bituminous coal by-products containing mixed natural humic acid polymers, quar gum, dialdehyde starch, Cantrez (General Aniline Vinyl-Maleic anhydride polymer, etherized cellulose, etherized cellulose carbohydrate polymers, etc. Additional polymeric materials such as cellulose and protein polymers may be used as modifiers and to promote and provide cross-linking reactions.

The lignin polymers of the invention co-react with carboxymethyl cellulose or with hydroxyethyl cellulose to produce polymers of high molecular weight. In this reaction the lignin spent sulfite liquor is neutralized with sodium hydroxide containing zinc oxide as a catalyst to bring the pH of the solution to about 7 to about 9. The carboxymethyl cellulose or hydroxyethyl cellulose is solubilized separately in water containing a catalyst consisting of ammonium chloride and an aldehyde. The ammonium chloride reacts specifically with the carbonyl groups of the lignin and cellulose to provide configurations such as those resulting in the reaction of amino groups by condensation with aldehydes. The cellulosic product containing the ammonium chloride catalyst and the aldehyde is then added to the neutralized lignin spent sulfite liquor and the cellulosic and the lignin polymers are condensed in subsequent reactions.

The high molecular weight lignins contain firmly bound sulfonic acid groups and carbonyl groups. In addition, the molecules contain aldehyde groups and hydroxyl groups, both aromatic and aliphatic. These groups and others such as methoxy groups all create a propensity of natural and synthetic tannins, and metals to react with the lignins to form colored products and to cross-link by reaction with the phenolic, hydroxyl, and aldehyde groups of the lignin. In the case of the reaction with phenolic groups, highly active hydrogen linkages are formed ortho or para to the hydroxy group or groups.

The present invention includes within its scope reactions between the lignin and aromatic hydroxy compounds in which at least one and preferably two or more active hydrogens are contained in the aromatic ring in positions ortho and para to the hydroxyl group or groups. The modified color coupling mordants of the invention include aromatic amines such as of para-phenylene diamine, 4-amino diphenylamine, the para-phenols, aromatic hydroxy compounds in which one and preferably two or more active hydrogens are positioned in the ring ortho and para to the OH substituent. Among these substances, the following are representative: Phenol, cresols, dihydric phenols, (e.g. resorcinol), quinol, pyrocatechol, pyrogallol, trihydroxy toluene, beta-resorcylic acid 3, 4 diamino toluene, trihydric phenols, naphthols, diazonium salts or bases, aniline and homologues of such substances which satisfy the requirements of ring hydrogens in ortho or para positions.

Other useful aromatic amines include phenylenediamines, naphthylamines, benzidine, toluidines and xylidines.

In accordance with an important embodiment of the present invention lignin base colorants are formed through the reaction of lignin with certain metal salts (hereinafter selectively identified as "insolubilizing metal salts"). Examples of so-called insolubilizing metal salts which can be employed in producing the lignin base colorants of the present invention include: sodium ferrocyanide, potassium ferrocyanide, ammonium ferrocyanide, sodium dichromate, potassium dichromate, ammonium dichromate, ferrous ammonium citrate, ferric ammonium citrate, ferrous nitrate, ferric nitrate, ferrous chloride, ferric chloride, ferrous sulfate, ferric sulfate, cuprous chloride, cupric chloride, cuprous sulfate, cupric sulfate, stannous chloride, stannic chloride, stannous sulfate, stannic sulfate, antimony chloride, antimony sulfate, sodium molybdate, sodium tungstate, aluminum potassium sulfate, sublimed or resublimed iodine, and other materials which exhibit like properties and characteristics. Where toxicity is not a problem, lead nitrate and lead sulfate can be employed in the lignin base dye or colorant formulations of the present invention.

The use of tannins in the lignin base reaction product of the present invention not only affords improved tonal characteristics to the colorants thereof but also substantially improves the color fastness thereof. Both synthetic and natural tannins are useful in the reactions of this invention. Examples of hydrolizable tannins which will dissolve both in acidic and alkaline lignin solutions are: valonia, sumac, quebracho, tannic acid, divi-divi, sandalwood, cochineal sac, logwood, tara, hypernic, fustic, turmeric, gambir tannins and bark tannins such as Rayflo C (Rayonier Inc., New York). Examples of non-hydrolizable tannins which dissolve in acidic lignin solutions (having a pH of from about 3.5 to 4.5) are: chestnut, myrabolam, mangrove, solid cutch, quercitron and wattle.

It is an important teaching of the present invention that lignin sulfonates neutralized to a pH of about 7 with ammonia, urea, or other alkaline material followed by the addition of a tannin such as tannic acid and the further addition of a metal salt such as iron chloride or copper chloride produces a dense black or dark colored polymer having desirable tonal characteristics. A dense black polymer is also produced by neutralizing a lignin sulfonate to a pH of about 7 with sodium hydroxide containing a catalyst such as zinc oxide. A color-coupling aromatic amine is then co-reacted with the neutralized lignin sulfonate and the co-reaction product is, finally, oxidized with hydrogen peroxide (30% concentration).

In still another example, a lignin sulfonate was reacted with a cellulosic or protein polymer and then neutralized with sodium hydroxide catalyzed with zinc oxide. The neutralized product was reacted with a color coupling phenol such as resorcinal and, finally, oxidized with 30% hydrogen peroxide to produce a black polymer.

The light absorption properties of the lignin polymers of the invention are important elements contributing to the usefulness of the invention. The black color obtained when the lignin polymers of the invention are colored by tannins or by phenols in the presence of metals, such as iron or copper, may be contrasted with the carbon black color of conventional inks which carbon black has a brown tone. The lignin colored mordant of the present invention are almost jet black and have a blue-violet tone.

Increase in alkalinity (or elevation in pH) increases the density of the color intermediates. It has also been found that ammonium base lignin spent sulfite liquors become more intensely colored than calcium base liquors. This more intense color is believed to be attributable to the combining of the amonium ions of the lignin with the color groups of the tannins, vegetable colorants or organic dyestuffs. The coniferylaldehyde groups of lignin polymers also react with tannins and metals and with phenols, amines, etc. to form color intermediates. Coniferylaldehyde and guaiacol groupings are destroyed by exothermic reactions or by the applications of heat during the removal of inorganic sulfur and inorganically combined calcium and wood degradation by-products of the waste sulfite liquor.

The feasibility of drying inks, pigments or dyes of the present invention by induction or by high frequency heating is a very important element in the ability of the lignin resins and admixture polymers of the invention to hydrogen-bond to hydrogen bonded paper. For example, the ink and pigment film printed on paper is passed through a magnetic field created by a coil which has an appropriate current supply passing through it. This electrical current produces induction heating in the electro-responsive ink vehicle and pigment. The resultant heat causes an increased activity and almost an instantaneous volatilization of the solvent molecules to effectuate rapid drying of the deposit.

Preferably, additional vegetable or synthetic tannins are added to the sulfonate liquor. Under these conditions, the additional tannins combine or react with the phenolic groups of the lignin molecules and greater quantities of iron will in turn combine with the lignin-tannin mixture to provide other variations of the resinous products of the invention. Under certain conditions, the sugars present in the lignin liquors are important in the formation of color-forming intermediates. It is believed that the sugars reduce iron in the system.

It is an important feature of the present invention that there is provided a new and economical process for the de-inking and the bleaching of paper printed with the lignin pigments of the invention. For example, when tannins or paraphenols, etc. are used in mordant systems to color the lignin polymers and copolymers of the invention, the colored ink pigments are readily bleachable during the de-inking process through the use of materials such as peroxide, chlorine, hypochlorites, potassium permanganate plus sodium hydrosulfite and hydantoin. A typical procedure is the following:

The catalogs, telephone directories, etc. which are to be reclaimed (and which have been printed with the lignin inks of this invention) are introduced into a blender or chopper containing the following materials:

| | Parts |
|---|---|
| Water | 4,000 |
| Aerosol OT (wetting agent or surfactant) | 10 |
| Sodium hydroxide | 10 |
| Bleaching agent, e.g. hypochlorite, etc. | 30 |

A pulp blend is produced and this is then washed, filtered and dried. An important advantage of this process, using paper printed with the lignin inks of the invention is that the pulp fibers are recovered free of all coloring material to provide a high quality reusable pulp. The lignin has been found to act as a suspending agent or colloid stabilizer and facilitates the removal of fillers from the fibers, these being separated during filtration of the pulp and discarded with the effluent.

This invention is further described with reference to the following additional illustrative examples which, are indicative of typical representative compositions and processes for manufacture of the same and are given for the purpose of illustrating the invention and are not intended to limit the scope of the invention. All of the reactant proportions in the examples are expressed in parts by weight, except where otherwise indicated.

As has been pointed out, the lignin products of the present invention are particularly useful in the formulation of colorants and color-forming intermediates of the type having utility in a wide variety of applications including printing ink compositions. The lignin base color forming intermediates of the invention have the very important property of being alkali dispersible to facilitate their separation from paper during pulp reclaiming operations. In addition, these lignin base color forming intermediates are readily bleached, chemically, to provide reclaimed pulp of unusually high quality.

The preparation of typical color forming intermediates is described in Examples 1 through 4.

EXAMPLE 1

| | Grams |
|---|---|
| Ferric chloride (corresponding to 80 grams of Fe metal) | 400 |
| Gallic acid | 20 |
| Tannic acid | 40 |
| Norlig lignin spent sulfite liquor, 50% solids (pH of from 3 to 4) | 3,000 |
| Ammonia | 25 |
| Urea | 20 |

Procedure

The iron salt, gallic acid, and tannic acid were added to the lignin liquor in a reactor equipped with an agitator, a heater, and a condenser and reacted for one hour at 190° F. and then cooled to 80° F. The pH of the resulting dispersion slurry was then adjusted to 7 with sodium hydroxide containing zinc oxide as a catalyst, using a neutralizing solution of the following composition:

|  | Grams |
|---|---|
| ZnO | 560 |
| NaOH | 1,430 |
| Water | 2,000 |

The aqueous dispersion was then heated to 160° F. and the ammonia and the urea added and agitation continued for 15 minutes.

Dimethylolurea may be substituted for the urea, and ethylene diamine, morpholine, etc., may be used instead of the ammonia.

The lignin-iron-tannic color forming intermediate product may be precipitated to form a filtered press cake pigment. If desired, the pigment may be admixed with carbon black or activated vegetable carbon to provide increased opacity for the pigment.

EXAMPLE 2

|  | Grams |
|---|---|
| Cupric chloride | 50 |
| Acid black 28 concentrated, Color Index acid black I (20470) | 100 |
| Hydroxyl ammonium sulfate, $NH_2OH_2H_2SO_4$ | 30 |
| Lignin spent sulfite liquor (52% solids, pH=3-4) | 1,000 |

Procedure

The lignin liquor was introduced into a reaction vessel equipped with an agitator, a heater, and a condenser, and heated to about 212° F. The acid black dyestuff was then added with agitation, maintaining the temperature at 212 degrees and holding that temperature for about 30 minutes. The cupric chloride was then added and the agitation and heating continued for 15 minutes longer. The temperature of the reaction mixture was reduced to 180° F. and the hydroxyl ammonium sulfate was then added. (The effect of the addition of the hydroxyl ammonium sulfate was to reduce the soluble cupric ions to form the insoluble cuprous ions providing a link between the lignin and the dyestuff to form a color mordant). The pH of the final slurry was adjusted to 7 by the addition of sodium hydroxide containing zinc oxide as a catalyst.

Two percent of carbon or vegetable black may be added to give increased opacity. In this small concentration, the carbon black will not interfere with subsequent pulp reclaiming. At concentrations of about two percent and below carbon black forms a filterable colloid and is thus removed from the final recovered pulp, in the filtrate.

EXAMPLE 3

|  | Grams |
|---|---|
| Monomethylol dimethyl hydantoin | 100 |
| Extracted animal protein (e.g. soluble dried blood) | 100 |
| Resorcinol | 25 |
| 4-amino diphenylamine | 25 |
| 30% hydrogen peroxide | 30 |
| Indulin, 25% solids, pH=8 | 3,000 |

Procedure

The alkali lignin was introduced into a reaction vessel equipped with an agitator, a heater, and a condenser and heated to about 200° F. The protein was added during agitation, and then the resorcinol and the amine. The mixture was maintained at 200° F. for 30 minutes. The monomethylol dimethyl hydantoin was added and the reaction mixture agitated, at 200° F., for an additional 30 minutes. The mixture was cooled to 90° F. and the hydrogen peroxide added, to provide a lignin base black colorant.

Carbon black, clay, bentonite, activated vegetable carbons, or like substrate matrials may be added as extender pigments or opacity agents.

EXAMPLE 4

|  | Grams |
|---|---|
| Quebracho tannin | 1,000 |
| Extracted animal protein (hide glue) (Collagen) | 500 |
| Ferric chloride solution (40° Baumé) | 200 |
| Lignin spent sulfite liquor (52% solids, pH=3-4) | 4,000 |
| Dialdehyde starch | 40 |
| Ammonium chloride | 80 |
| Urea | 80 |

Procedure

Part I: The lignin liquor was introduced into a reaction vessel fitted with an agitator, a heater, and a condenser, and the slurry heated to about 200° F., with agitation. The tannin and the hide glue were then introduced into the reaction vessel, with agitation, and the mixture maintained at 200° F. for 30 minutes. The iron chloride solution was then added and the reaction continued for 30 minutes longer at 200° F. The resulting colorant was cooled to 120° F. and then neutralized to a pH of 7 using sodium hydroxide containing zinc oxide as a catalyst.

Part II: The colorant of Part I was condensed with urea and dialdehyde starch containing ammonium chloride as a catalyst, the reaction being carried out at 220° F. with high speed agitation.

The aldehyde, containing the ammonium chloride catalyst, may be intermixed with a previously prepared cellulosic or protein polymer to provide further cross-linking of the lignin polymer.

The following examples are directed to the separation of novel logwood-lignin complex extracts and to the preparation of logwood-lignin dyes, colorants, pigments, etc. Logwood in the form of logs, chips, or extract contains a chromogen color forming substance known as haematein or haematoxylin, and when racted with alkali or acid lignin black liquors in the presence of an acid and a metallic base forms a color lake. For example, the reaction of the logwood chromogen with ferric chloride produces a blue-black lake, with potassium or sodium bichromate, a jet black pigment, with copper sulphate, a violet black pigment, and upon reaction with antimony chloride a violet pigment. All of these lakes and pigments are, in accordance with the practice of the present invention, readily bleachable during de-inking processes.

It is believed that during these reactions the lignin forms complex polymer chains and the logwood (haematoxylin) forms complex color intermediates. Both reactants contain carbohydrates (wood sugar), phenolic hydroxyl and other active groups of the type necessary to produce a bleachable black color complex or pigment and to form black color lakes and black inks having polymeric structures. The logwood colorants, dyes, pigments, etc. of the present invention are superior to prior art logwood pigments in several important respects. The prior art logwood pigments are costly as compared with the pigments of the present invention. Moreover, with a moisture content of about 20% or below, the prior art logwood pigments are highly susceptible to oxidation. The oxidation which takes place destroys the tinctorial strength of the pigment. In contrast, the logwood-lignin complexes of the present invention are relatively stable to oxidation and constitute important colorants or color intermediates useful in the preparation of printing inks.

Lignins, particularly from such sources as hemlock, pine, etc., contain tannins glucosides and other carbohydrates, and phenolic and hydroxyl groups which combine with the active linkages of the logwood (haematoxylin) to form crossed linked chromogen color forming substances. The preparation of a logwood-lignin complex extract, in accordance with the practice of the present invention is described below as Example 5.

EXAMPLE 5

| | Grams |
|---|---|
| Alkali lignin pH 9 to 11 (50% solids) | 1,000 |
| Mexican logwood chips (ground fine) | 220 |
| Tannic acid | 20 |
| Surfactant | 5 |
| Dicyandiamide | 10 |

Procedure

All of the reactants were introduced into a vessel equipped with an agitator, a heater, a condenser and adapted for pressure reactions. The mixture was digested at about 215° F. at a pressure of between 1 and 2 atmospheres for about two hours to produce a lignin-logwood extract having a density of 10 degrees Bé. after filtration.

As an alternative procedure, a diffusion process similar to that used in sugar refining can also be utilized to prepare the logwood extract.

The logwood-lignin extract described above is used in the preparation of pigments or color-forming chromogens which are particularly useful in the preparation of printing inks. The examples below are typical.

EXAMPLE 6

To 1,000 parts by weight of the logwood-lignin extract of Example 5, there is added any of the following reactants to produce the chromogen described.

(A) 20 parts by weight of potassium chromate to produce a deep black chromogen.
(B) 20 parts by weight of ferric chloride to produce a blue-black chromogen.
(C) 20 parts by weight of copper sulphate to produce a violet black chromogen.
(D) 20 parts by weight of iron sulphate to produce a deep blue-black chromogen.
(E) 20 parts by weight of sodium chromate to produce a deep violet black chromogen.

The precipitated black pigment produced in each case is filtered and, if necessary, dried.

Preferred color forming chromogens are prepared, in accordance with the practice of the present invention, by a reaction in which the logwood-lignin complex or extract is reacted with lignin and with metallic salts. A typical example of such a reaction and the method of preparation of these preferred color forming products is given below in Example 7.

EXAMPLE 7

| | Grams |
|---|---|
| Acid lignin black liquor, raw, pH 3.5 to 4 (50% solids) | 1,000 |
| Logwood extract (American Dyewood Company) | 120 |
| Iron sulphate | 40 |
| Sodium bichromate | 10 |
| Aluminum chloride | 20 |

Procedure

The acid lignin black liquor is introduced into a reaction vessel equipped with an agitator, a heater, and a condenser, and the temperature of the liquor raised to about 180° F. The logwood extract is then added and the reaction continued for an additional hour at about 190° F. The iron sulphate (ferrous sulphate) are then added and the reaction continued for an additional 30 minutes after which the sodium bichromate is added. After heating for an additional 30 minutes at about 170° F., the aluminum chloride is added and the lignin-logwood complex precipitated to produce a black pigment having a deep blue-black tone. The pigment may be washed and filtered and, if necessary, dried.

EXAMPLE 8

| | Grams |
|---|---|
| Rayflo C (a bark lignin marketed by Rayonier, Inc., New York, N.Y.) | 100 |
| Ferrous sulfate | 20 |
| Water | 1000 |

Procedure

The bark lignin, ferrous sulfate and water are placed in a reactor equipped with an agitator, a heater and a condenser and reacted for ten minutes at 200 F. The pH of the resulting dispersion slurry can, if desired, be adjusted to 7 with the sodium hydroxide-zinc oxide neutralizing solution described in Example 1.

The reaction product is decanted, filtered and dried leaving a colorant-pigment product characterized by an over-all black color having a greenish cast.

Any of the "insolubilizing metal salts" previously identified in this specification can be substituted for, or used in conjunction with the ferrous sulfate constituent.

EXAMPLE 9

| | Grams |
|---|---|
| Norlig lignin spent sulfite liquor (50% solids) | 200 |
| Ferrous sulfate | 20 |
| Potassium dichromate | 2 |
| Water | 1000 |
| Logwood chips (finely ground) | 100 |

Procedure

The lignin logwood chips and water are placed in a reactor equipped with an agitator, a heater and a condenser and reacted for thirty minutes at 200° F.-212° F. As soon as the colorant is extracted from the logwood the ferrous sulfate is added and the reaction continued for 30 minutes. The potassium dichromate is then added with constant agitation to insure thorough mixing.

The reaction product is then decanted, filtered and dried leaving a colorant-pigment product having excellent tonal characteristics and exhibiting the properties of being alkali dispersible and readily bleachable.

Any of the previously identified "insolubilizing metal salts" can be substituted in place of, or used in conjunction with the ferrous sulfate. Similarly, any of the previously identified tannins can be used in place of, or in conjunction with the logwood chips.

EXAMPLE 10

| | Grams |
|---|---|
| Norlig lignin spent sulfite liquor (50% solids) pH 1.5 to 3 | 100 |
| Potassium dichromate | 2 |
| Extracted animal protein (e.g. hide glue or gelatin) | 100 |
| Water | 1000 |
| Quebracho tannin | 100 |

Procedure

The lignin, animal protein and water are placed in a reactor equipped with an agitator, a heater and a condenser and reacted for ten minutes at a temperature of from 180° F. to 200° F. If desired, the pH of the resultant dispersion can be adjusted with a suitable neutralizing solution.

The metal salt (potassium dichromate or equivalent "insolubilizing metal salt") is then added to the dispersion with constant mixing and with the temperature being maintained at about 180° F. and 200° F.

The tannin (quebracho or an equivalent) is then added to the above slurry with constant mixing for approximately ten minutes and with the temperature being maintained at about 180° F. to 200° F. The reaction product is then decanted, filtered and dried.

The product of this example is a black colorant-pigment having excellent tonal characteristics and exhibiting the properties of being both alkali dispersible and readily bleachable.

EXAMPLE 11

| | Grams |
|---|---|
| Norlig lignin spent sulfite liquor (50% solids) neutralized to a pH of 7 | 4000 |

| | Grams |
|---|---|
| Quebracho extract | 200 |
| Dicyandiamine | 40 |
| Logwood extract | 300 |
| Fustic tannin | 60 |
| Hypernic tannin | 60 |
| Triethanolamine | 40 |
| Bentonite clay (or Zeolex 7 synthetic aluminum silica) | 120 |
| Carbon black | 120 |

Procedure

The above ingredients are placed in a reactor equipped with a shear mixer and heated to a temperature of 200° F. for a period of ten minutes. Since the reaction occurs immediately, the actual time of mixing is not essential, the only requirement being that thorough and uniform mixing of these various components be effected.

As soon as the above step is completed and thorough mixing effected, 60 grams of ferrous sulfate and 150 mls. of water are added thereto and thorough mixing again effected by means of the shear blender. The temperature is maintained at 200° F. in order to insure that the water contained therein does not evaporate off.

A solution of 20 grams of sodium dichromate and 200 mls. of water is then added to the reactor with constant mixing and the temperature maintained at 200° F. or below. The reaction product is then decanted, filtered and dried.

The lignin base black colorant-pigment of this example offers excellent tonal characteristics and is particularly suitable as an ink base for use in manufacturing printing inks.

EXAMPLE 12

Part A

| | Grams |
|---|---|
| Norlig spent sulfite liquor (50% solids) neutralized to a pH of 7 | 2000 |
| or | |
| Rayflo C (a bark lignin marketed by Rayonier) dissolved in 1000 grams of water | 1000 |
| Logwood extract | 300 to 600 |
| Fustic extract | 30 to 60 |
| Hypernic extract | 30 to 60 |

The above ingredients are placed in a reactor equipped with an agitator, a heater and a condenser wherein they are mixed for about 10 minutes at a temperature of from 180° F. to 200° F.

Part B

| | Grams |
|---|---|
| Water | 1800 |
| Quebracho extract (or equivalent tannin extract) | 200 |
| Dicyandiamine | 30 |
| Ferric sulfate | 60 |
| "Zeolex 7" or equivalent substrate clay | 120 |
| Channel Carbon Black | 120 |

The above ingredients are added to a reactor equipped with a shear mixer and a heater and shear mixed for about ½ hour at a temperature of 140° F.

Part C

| | Grams |
|---|---|
| Arquad 2S (Armour Industrial Chemical Co., Chicago, dialkyl dimethyl ammonium chloride) | 30 |
| Ethomeen S/12 acetate [1] | 1 |

[1] Ethomeen S/12 Acetate is prepared by neutralizing 100 parts of Ethomeen S/12 (Armour Industrial Chemical Co., ethoxylated amine) with 16.4 parts of glacial acetic acid.

The above ingredients are then added to the product of Part B with shear mixing and with the temperature being maintained at 140° F.

Part D 200 mg. sodium hydroxide
200 ml. water

The above ingredients are then added to the product of Part C with constant mixing for about ten minutes.

Part E

The dispersion product of Part A is then added to the product of Part D with shear mixing for ten minutes and with the temperature being maintained at 200° F.

Part F 20 grams potassium dichromate (or equivalent "insolubilizing metal salt")
200 ml. water The above ingredients are added to the product of Part E with constant mixing and at a temperature of 200° F. or below.

The product of Part F is a lignin base oleophilic pigment-dye which can be used to color substrates which do not have an affinity for metals, such as wool, silk, nylon, etc. It is particularly suitable for coloring seeds, fabrics, cellulosic fibers and the like.

If desired, various organic dyestuffs, or their intermediates such as acid, azo, diazo, triarylmethane and acid triarylmethane dyestuffs may be added for tonal shading. Similarly, if desired, the lignin base colorant may be replaced by suitable vegetable dyestuffs, such as acid blacks, nigrosine blacks, all of which have high absorbing properties to the cationic oleophilic amine.

If desired, the lignin acid liquors (before neutralization) of Part A may be heated with scrap ferrous iron and tannins. The pH is then adjusted to 7 resulting in the formation of pyrolignous iron having higher color absorbing properties and ferrous lignin oxide polymer which when dried, will leave a powder residue which can be magnetized.

The amount of insolubilizing metal salt identified in Part B will vary in accordance with the desired tonal characteristics of the finished dye. In general, a minimum concentration of from 10 to 40 grams is preferred with a maximum concentration of this ingredient ranging from approximately 100 to 260 grams.

EXAMPLE 13

This example is directed to a lignin base ink made from a lignin base colorant-pigment of the present invention.

Part A 2800 ml. Norlig Calcium Base Black Lignin (neutralized to pH 7 with NaOH)
30 grams Dicyandiamide
200 grams Carbon Black
100 grams Zeolex 7 Clay
30 grams Arquad 2S/75 (a 75% additive dimethyl dialkyl quaternary ammonium compound derived from soya fatty acid, Armour Industrial Chemical Co., Chicago, Ill.
1 gram Ethomeen S/12 acetate[1] (ethoxylated amine, Armour Industrial Chemical Co., Chicago, Ill.)
Solution of 200 mg. NaOH and 200 ml. water
Solution of 40 grams ferrous sulfate and 200 ml. water
500 grams logwood extract
100 grams Rayflo C (a bark derived tannin, Rayonier, Inc., New York, N.Y.) combined 400 ml. water
Solution of 30 grams potassium dichromate and 200 ml. water

[1] Ethomeen S/12 acetate is prepared by neutralizing 100 parts of Ethomeen S/12 with 16.4 parts of glacine acetic acid.

The Norlig lignin, dicyandiamide, carbon black and Zeolex 7 Clay are added to a Kady Dispersion Mill at a temperature of 70° F. After being treated therein for 4 minutes the temperature of the mixtures rises to about 140° F. The Arquad 2S/75 and Ethomeen acetate are combined and added to the mill. The sodium hydroxide solution and the ferrous sulfate solution are then added consecutively to the mill with thorough mixing after the addition of each of these ingredients.

In a separate reactor, the logwood extract and Rayflo C-water mixture are combined and mixed at a temperature of about 180° F. The logwood extract-Rayflo C-water mixture is then added to the Kady Dispersion Mill containing all of the above ingredients. The potassium dichromate solution is added with further mixing. As soon as the temperature reaches 190° F., the reaction produce of these ingredients is cooled, decanted, filtered and dried, leaving a lignin base colorant-pigment which, in accordance with the present invention, exhibits the advantageous properties of being alkali dispersible and readily bleachable.

Part B

The next step of this example concerns taking the lignin base colorant-pigment and combining the same with a suitable oil base to provide an emulsion ink.

500 grams of the lignin oleophilic colorant-pigment of Part A
100 grams 30% aqueous "Cellosize" (hydroxyethyl cellulose, Union Carbide)
15 grams Gafac RE 610, 10 grams Gafac RE 960 (complex organic phosphate ester emulsifiers, General Aniline Corp.)
20 grams glyoxyl
150 grams of oil base (the formulation of which is described below)

The lignin base colorant-pigment, Cellosize, Gafac RE 610 and RE 960 and Glyoxyl are combined, heated to 140° F. and shear mixed for about 5 minutes. The oil base is then added with shear mixing for another 5 minutes, and the product so formed homogenized by a suitable means such as for example by treating it in a mechanical pressure pump, ultrasonic pressure pump, etc. to provide an emulsion ink product which is particularly suitably for use as a publication or newspaper printing ink.

It will be apparent to those skilled in that art that the Cellosize and Glyoxyl are insolubilizers which provide the ink product with water resistance. As such, the inclusion of these materials in the present invention is not essential but when used impart this advantageous characteristic to ink product. The Gafac RE 610 and RE 960 are surfactants which enable the emulsification of the lignin base colorant-pigment. Other surfactants, known to those skilled in this art, can be substituted or used in place of the Gafac compounds identified above.

A suitable oil base which can be used in the above formulation can be prepared from the following ingredients.

1200 grams paraffin oil #11 (Standard Oil, Division of American Oil Co.)
70 grams Petronate CR (a petroleum sulfonate, Sonneborn Co., Division of Witco Chemical Co.)
30 grams Igepol CO–630 (an ethoxylated nonylphenol, General Aniline Corp.)

The above ingredients are thoroughly mixed with heating to facilitate the mixing thereof. In the above oil base formulation, the Igepol CO–630 acts as a wetting agent and emulsifier. As such, it is not essential to the above formulation. The Petronate CR acts as an emulsifier and enables the emulsification of the oil. In this regard, other emulsifiers may be substituted for or used in conjunction therewith. Other oils which may be used in place of or in conjunction with the paraffin oil #11 include various crude petroleum oils, aliphatic petroleum oils (deodorized kerosene), paraffin oils, linseed oils, tung oils and the like.

EXAMPLE 14

This example is also directed to a lignin base ink made from the lignin base-colorant of the present invention.

Part A 1400 ml. of Norlig Calcium Base Lignin Liquor (50% solids) neutralized to pH 7 with sodium hydroxide (Marathon Chemical Co.)
1400 ml. of water
90 grams Cellosize WP–09 (hydroxyethyl cellulose, Union Carbide Co.)
30 grams dicyandiamide
300 grams Carbon Black
30 grams Arquad 2S/75
1 gram Ethomeen acetate
Solution of 200 mg. sodium hydroxide in 200 ml. of water
Solution of 40 grams of ferrous sulfate in 200 ml. of water
500 grams logwood extract
Solution of 30 grams of potassium dichromate in 200 ml. of water The Cellosize is combined with the 1400 ml. of water in a reactor and heated to 160° F. with shear mixing. Norlig lignin is then added with shear mixing and the dicyandiamide (a suitable fluidizer) combined therewith. Carbon black is then added to the above mixture with shear blending for 15 minutes at a temperature of about 140° F.

A cationic oleophilic amine prepared with the Arquad 2S/75 and Ethomeen acetate in the manner described in Examples 12 and 13 is then added to the reactor with shear blending. This mixture is then neutralized with the sodium hydroxide solution and the iron sulfate solution, logwood extract and potassium dichromate solution consecutively added to the reactor with shear mixing after the addition of each of these ingredients.

The resultant reaction product is heated to a temperature of from approximately 190° to 212° F. and permitted to cool, at which time it is decanted, filtered and dried, leaving a black lignin base pigment product which advantageously exhibits oleophilic properties.

Part B 200 grams Maracarb (an invert wood sugar, Marathon Chemical Co.)
30 grams Arlacel 186 (a Mono- and diglyceride emulsifier, Atlas Chemical Industries, Inc., Wilmington, Del.)
200 grams paraffin oil #11 (Standard Oil Division, American Oil Company)
600 grams of the lignin base black pigment product of Part A The Arlacel 186 is added to the Maracarb with shear mixing at room temperature to form an emulsion base gel. The paraffin oil is then added to this gel, heated to 140° F. and shear mixed to form an emulsifying base for the lignin base pigment which is then added to the emulsifying base with shear mixing (or other appropriate dispersion means) forming a highly viscous emulsion which is very difficult to break and which exhibits advantageous lubricating properties making it particularly suitable for use as a printing or publication ink.

In this conection, it should be noted that the use of an invert lignin wood sugar such as the Maracarb enables the production of a high quality printing ink exhibiting the previously mentioned advantages of the present invention and having a substantially lower cost than presently available commercial inks. While invert lignin wood sugars such as Maracarb are preferred in the emulsifying base formulation, other lignins can be suitably used in place thereof or, in conjunction therewith. For example, if desired, a suitable emulsifying base could be formed by mixing any of the lignins mentioned in this application with an emulsifier and an oil.

The above mentioned ink can be made waterproof by the addition of glyoxyl. Typically, from about 20 to 60 grams of glyoxyl would be suitable for these additional treatment steps.

It should also be noted that the lignin-emulsifier-oil base of Part B can be suitably combined with non-lignin base pigments to form an ink. For example, suitable inks can be prepared by combining a carbon black pigment with the formulation of Part B.

EXAMPLE 15

This example is directed to an ink formulation made from an oleophilic lignin base black pigment of the present invention and a suitable oil. This example is distinguishable from the previous example in that the pigment vehicle does not contain an emulsified.

800 grams lignin base black pigment product of Part A of Example 14
200 grams paraffin oil #11 (Standard Oil Division, American Oil Company)
50 grams glyoxyl The lignin base black pigment is heated to approximately 100° F. with high speed shear mixing. The paraffin oil is then added to the lignin base black pigment, and heated to 140° with continued high speed shear mixing resulting in the production of an emulsion type ink which is particularly suitable for use as a printing ink. If desired, the glyoxyl (or other suitable aldehyde) can be added to impart waterproof properties to the ink product.

It is important to note that the lignin-insolubilizing metallic salt and/or tannin reaction product of the present invention can be combined with other substrate materials and/or colorants. For example, certain materials, such as, carbon black, act both as an additional colorant and as an opacifier (substrate) when combined with the novel reaction product of the present invention. Similarly, there are other materials which when combined with this reaction product only lend opacity thereto. Typical of these materials are the substrates such as clays (i.e. bentonite) as well as the oxides, carbonates, sulfates or silicates of aluminum, barium, calcium, magnesium, silicon or titanium.

While the invention has been described and illustrated by way of preferred embodiments thereof, it will be apparent to those skilled in the art that variations and modifications may be made without departing from the scope of the present invention as defined by the appended claims.

I claim:

1. An improved ink composition which includes a lignin base colorant dispersed in a vehicle, the improvement wherein said lignin base colorant is the reaction product formed by chemically reacting one part by weight of a metal insolubilizing salt with from 3.75 to 41.5 parts by weight of a lignin at a temperature of from about 180° F. to 212° F., said metal insolubilizing salt being selected from the group consisting of sodium ferrocyanide, potassium ferrocyanide, ammonium ferrocyanide, sodium dichromate, potassium dichromate, ammonium dichromate, ferrous ammonium citrate, ferric ammonium citrate, ferrous nitrate, ferric nitrate, ferrous chloride, ferric chloride, ferrous sulfate, ferric sulfate, cuprous chloride, cupric chloride, cuprous sulfate, cupric sulfate, stannous chloride, stannic chloride, stannous sulfate, stannic sulfate, antimony chloride, antimony sulfate, sodium molybdate, sodium tungstate, aluminum potassium sulfate, sublimed iodine, resublimed iodine, lead nitrate and lead sulfate.

2. The ink composition of claim 1 wherein said lignin base colorant includes one part tannin for each 0.5 to 25 parts by weight of said lignin.

3. The ink composition of claim 1 wherein said vehicle is an oil.

4. The ink composition of claim 1 wherein said vehicle is an oil and water emulsion.

References Cited

UNITED STATES PATENTS

| 1,716,623 | 6/1929 | Collins et al. | 106—123 XR |
|---|---|---|---|
| 1,860,043 | 5/1932 | Ludwigsen | 106—123 |
| 1,878,828 | 9/1932 | Cross et al. | 106—123 XR |
| 2,457,357 | 12/1948 | Fenn | 106—123 XR |
| 2,578,695 | 12/1951 | Goss | 106—123 XR |
| 2,680,113 | 6/1954 | Adler et al. | 106—123 XR |
| 2,690,973 | 10/1954 | Voet | 106—123 XR |
| 2,760,943 | 8/1956 | Sohn | 106—123 XR |
| 2,822,358 | 2/1958 | Hearon et al. | 106—123 XR |
| 3,017,303 | 1/1962 | Ayers | 106—123 XR |
| 3,043,784 | 7/1962 | Remer | 106—123 XR |
| 2,432,461 | 12/7947 | Vesce | 106/307 XR |
| 2,794,749 | 6/1957 | Schulze | 106—307 |

FOREIGN PATENTS

| 615,140 | 2/1961 | Canada. |
|---|---|---|
| 693,760 | 7/1953 | Great Britain. |

JULIUS FROME, Primary Examiner

J. B. EVANS, Assistant Examiner

U.S. Cl. X.R.

106—25, 32, 123, 285; 260—17.5, 124

UNITED STATES PATENT OFFICE
CERTIFICATE OF CORRECTION

Patent No. 3,503,762           Dated    March 31, 1970

Inventor(s)   Robert K. Remer

It is certified that error appears in the above-identified patent and that said Letters Patent are hereby corrected as shown below:

```
Column 3, line 61, delete "potassium hydroxide,"
Column 4, line 33, "and" should be --are--
Column 4, line 40, "form" should be --from--
Column 5, line 24, after "well" insert --as--
Column 8, line 32, "methoxy" should be --methoxyl--
Column 11, line 65, "25%" should be --52%--
Column 12, line 39, "racted" should be --reacted--
Column 14, line 7, "200 F." should be --200°F.--
Column 14, line 62, "and" should be --to--
Column 16, line 59, after "Ill." insert a parenthesis mark
Column 16, line 70, "glacine" should be --glacial--
Column 17, line 11, "produce" should be --product--
Column 17, line 41, "suitably" should be --suitable--
Column 19, line 17, "emulsified" should be --emulsifier--
```

SIGNED AND SEALED
AUG 25 1970

(SEAL)
Attest:

Edward M. Fletcher, Jr.
Attesting Officer

WILLIAM E. SCHUYLER, JR.
Commissioner of Patents